(12) United States Patent
Choi

(10) Patent No.: US 10,375,970 B2
(45) Date of Patent: Aug. 13, 2019

(54) APPARATUS AND METHOD FOR ROLLING SAUSAGE ROLLS

(71) Applicant: Young S Choi, Carrollton, TX (US)

(72) Inventor: Young S Choi, Carrollton, TX (US)

( * ) Notice: Subject to any disclaimer, the term of this patent is extended or adjusted under 35 U.S.C. 154(b) by 128 days.

(21) Appl. No.: 15/362,353

(22) Filed: Nov. 28, 2016

(65) Prior Publication Data

US 2018/0146686 A1    May 31, 2018

(51) Int. Cl.
| | |
|---|---|
| *A22C 11/00* | (2006.01) |
| *A21C 9/06* | (2006.01) |
| *A22C 7/00* | (2006.01) |
| *A23P 20/20* | (2016.01) |

(52) U.S. Cl.
CPC ............ *A22C 11/008* (2013.01); *A21C 9/061* (2013.01); *A21C 9/063* (2013.01); *A22C 7/0007* (2013.01); *A23P 20/20* (2016.08)

(58) Field of Classification Search
None
See application file for complete search history.

(56) References Cited

U.S. PATENT DOCUMENTS

| | | | | |
|---|---|---|---|---|
| 3,604,367 A | * | 9/1971 | Arries | A21C 3/06 |
| | | | | 425/297 |
| 3,802,824 A | * | 4/1974 | Amster | A21C 11/002 |
| | | | | 425/230 |
| 4,880,375 A | * | 11/1989 | Hayashi | A21C 3/02 |
| | | | | 425/335 |
| 5,263,407 A | * | 11/1993 | Pomara, Jr. | A23P 20/20 |
| | | | | 99/450.6 |
| 8,353,742 B1 | * | 1/2013 | Choi | A21C 3/06 |
| | | | | 452/32 |
| 2015/0183543 A1 | * | 7/2015 | Thai | B65B 67/10 |
| | | | | 53/466 |

* cited by examiner

*Primary Examiner* — Jacob T Minskey
*Assistant Examiner* — Baileigh Kate Darnell
(74) *Attorney, Agent, or Firm* — Sul Lee

(57) ABSTRACT

A sausage rolling machine utilizes gravity to reduce costs when rolling a food dough casing around a sausage. A first conveyor rotates in a first direction so as to move a food dough casing toward an edge of the first conveyor. A second conveyor is disposed below the first conveyor. A sausage dispenser dispenses a sausage. A hinged unit is disposed below the sausage dispenser and includes a hinge and a tray portion extending from the hinge. The hinged unit receives the food dough casing that is falling off the edge of the first conveyor when the hinged unit is at rest, initiates wrapping of the food dough casing around the sausage, and rotates the tray portion about the hinge, causing the sausage to roll onto the second conveyor while also causing the sausage to be partially wrapped by the food dough casing.

10 Claims, 6 Drawing Sheets

APPARATUS AND METHOD FOR ROLLING SAUSAGE ROLLS

TECHNICAL FIELD

The present application relates generally to an apparatus and method for rolling sausage rolls.

BACKGROUND

The embodiments of present invention relates to making sausage rolls. Typically, sausage rolls are made manually. Making the sausage rolls manually is time consuming labor. In addition, manually creating the sausage rolls likely to have non-uniform shapes and sizes. Moreover, it is hard to conduct mass production with when manually making sausage rolls.

SUMMARY

To address the above-discussed deficiencies of the prior art and to develop technologies that are compatible to the new display changes, it is a primary object to provide an apparatus for making a sausage roll.

According, to an embodiment, an apparatus for rolling a food dough casing around a sausage includes a first conveyor configured to rotate in a first direction so as to move a food dough casing toward an edge of the first conveyor: a second conveyor disposed below the first conveyor; a sausage dispenser configured to dispense a sausage; a hinged unit disposed below the sausage dispenser and comprising a hinge and a tray portion extending from the hinge, the hinged unit configured to receive at least a portion of the load dough casing that is falling off the edge of the first conveyor when the hinged unit is at a first position, initiate wrapping of the food dough casing around the sausage, and rotate the tray portion about the hinge to a second position such that gravity causes the sausage to roll in a second direction onto the second conveyor while also causing the sausage to be partially wrapped by the food dough casing, wherein the rotation of the first conveyor above the second conveyor causes the sausage that is partially wrapped to move in the second direction while causing the sausage to be fully wrapped by the food dough casing.

According to an embodiment, the first conveyor and the second conveyor are substantially parallel to each other.

According to an embodiment, the apparatus further includes a plurality of dampers operatively coupled to the bottom of the second conveyor.

According to an embodiment, the apparatus further includes a sausage holder configured to receive the sausage being dispensed from the sausage dispenser.

According to an embodiment, the hinged unit further includes an angled tray unit and a hinge actuator. The hinged unit guides the falling portion of the food dough casing below the sausage that is resting on the sausage holder and initiates the wrapping of the food dough casing around the sausage. The hinge actuator is coupled to the hinge and rotates the tray portion of the hinged unit between the first position and the second position.

According to an embodiment the apparatus further includes a pressing roller rotatably fixed above the first conveyor to press down on the food dough casing that is falling over the edge of the first conveyor.

According to an embodiment, the first conveyor includes a first pair of rollers and a first belt wrapped around the first pair of rollers to form a first surface on which the food dough casing is moved toward the edge of the first conveyor. The apparatus further includes a first actuator operatively coupled to one of the first pair of rollers and configured to rotate the first belt of the first conveyor in the first direction.

According to an embodiment, the second conveyor includes a second pair of rollers and a second belt wrapped around the second pair of rollers to form a second surface.

According to an embodiment, the apparatus further includes a first actuator operatively coupled to one of the pair of rollers to rotate the belt of the conveyor in the first direction.

According to an embodiment, the second conveyor rotates in the first direction, such that the first conveyor rotates at a faster rate than the second conveyor.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus for repairing display screens.

Figure 1:
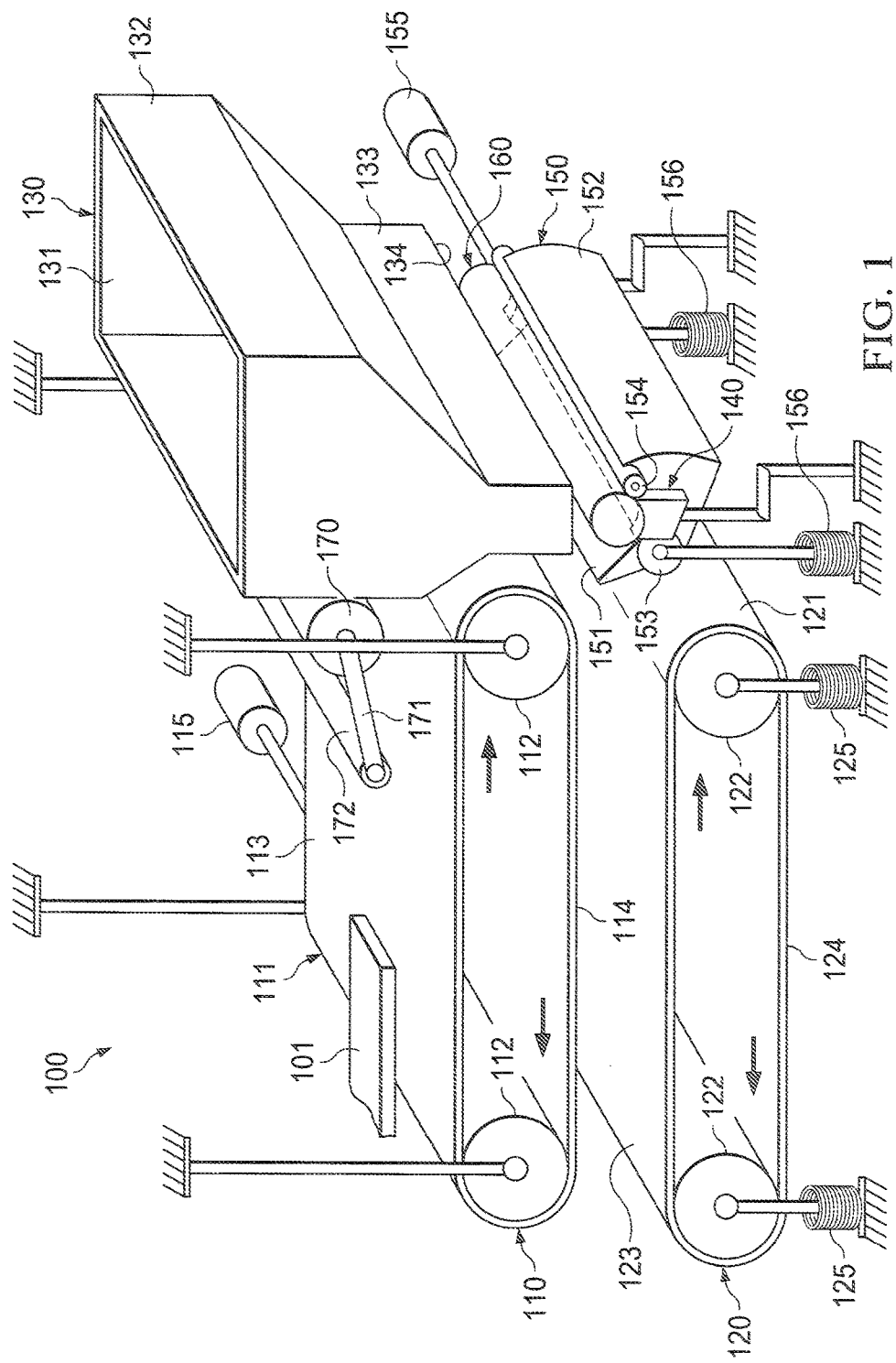
FIG. 1 is a diagrammatic perspective view of a sausage roll making device according to an embodiment of the disclosure.

Referring now to the figures, in which like numerals indicate like parts, and particularly to FIG. 1, which is a diagrammatic perspective view of the machine of the embodiments of the present invention that utilizes gravity to reduce costs when rolling a food dough casing around, a sausage, the machine of the embodiments of the present disclosure is shown generally at device 100.

As already mentioned, FIG. 1 is a diagrammatic perspective view of a sausage roll making device according to an embodiment of the disclosure. The device 100 comprises a first conveyer 110, second conveyer 120, sausage dispenser 130, and a hinged tray unit 150, according to an embodiment of the disclosure.

The second conveyor 120 is disposed on one side of the hinged tray unit 150 and is rotatably affixed to a horizontal surface, according to an embodiment of the present disclosure.

The first conveyor 110 is rotatably affixed above the second conveyor 120 and is for conveying food dough casing 101, initially, and thereafter, the food dough casing 101 falls downwardly by gravity.

The sausage dispenser 130 is disposed above the hinged tray unit 150 and is for dispensing sausage 160, such that sausage 160 falls downwardly by gravity to the hinged tray unit 150.

The hinged tray unit 150 is disposed near a top surface on one side of the second conveyor 120, directly below a bottom opening of the sausage dispenser 150, and is affixed to a horizontal surface according to an embodiment. The hinged tray unit 130 is for receiving the food dough casing 101 that is falling from the first conveyor 110, receiving sausage 160 that is falling from the sausage dispenser 130, partially rolling the food dough casing 101 around the sausage 160, and relaying a partially rolled sausage (or partially food dough cased sausage) to the second conveyor 120.

In an embodiment, the first conveyor 110, the second conveyor 120, and the hinged tray unit 150 may all be disposed at different elevations to allow gravity to assist in moving the food dough easing 101, and the partially rolled sausage 160 within the device 100.

In an embodiment, a pressing roller 170 may be added to the device 100. In another embodiment, an operator of the device 100 may directly place a sausage to the hinged tray unit 150 if the sausage dispenser 130 is not in use.

Figure 6:
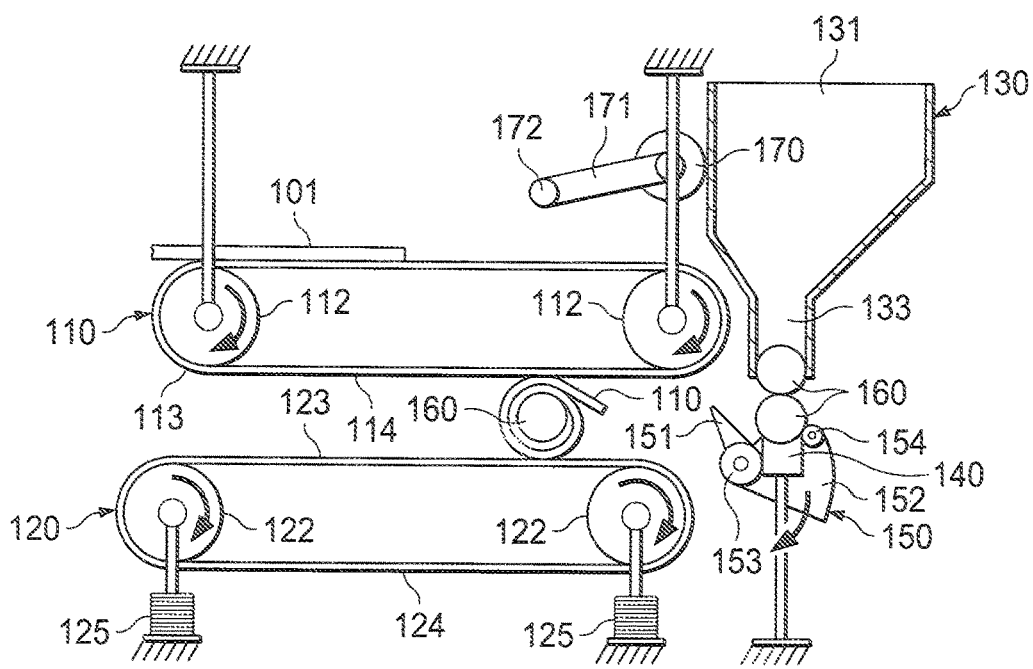
FIG. 6 is a diagrammatic side view illustrating a final state of the first type of sausage rolling machine according to an embodiment of the present disclosure.

The first conveyer 110 comprises a first belt 111 and a pair of first rollers 112, is substantially horizontally oriented, and is for conveying food dough casing 101, initially, and is also for rolling the food dough casing 101 around a food product, such as, a sausage 160 (as illustrated in FIG. 6).

The first conveyor 110 further includes a first actuator 115. The first actuator 115 of the first conveyor 110 may be operatively connected to one or both of the pair of first rollers 112, so as to move the first belt 111 of the first conveyor 110, with the food dough casing 101 thereon, in a first direction toward the sausage dispenser 130. According to an embodiment, the first actuator 115 may be implemented as a motor. The first belt 111 of the first conveyor 110 wraps around the first pair of rollers 112, such that a first upper portion 113 of the first belt 111 moves in the first direction toward the sausage dispenser 130 while a first lower portion 114 of the first belt 111 moves in a second direction away from the sausage dispenser 130. The first actuator 115 causes the food dough casing 101, when on the first upper portion 113, to move toward the edge of the first conveyer 110 that is closest to the sausage dispenser. As the food dough casing 101 moves past the edge, the food dough casing 101 falls down toward the hinged tray unit 150. Meanwhile, the first lower portion 114 moves away from the hinged tray unit 150.

The second conveyor 120 comprises a second belt 121 and a pair of second rollers 122, and is substantially horizontally oriented so as to be parallel to and below the first conveyor 110. In an embodiment, the second conveyor further includes a second actuator (not shown) that operates similarly to the first actuator 115. The second actuator of the second conveyor 120 may be operatively connected to one or both of the pair of second rollers 122, so as to move an object resting on the second belt 121 in the second direction away from the sausage dispenser 130. According to an embodiment, the second actuator may be implemented as a motor. According to an embodiment the second direction is opposite from the first direction. According to another embodiment, the second conveyor does not include the second actuator and, instead, remains stationary. The second belt 121 is wrapped around the pair of second rollers 122, such that a second upper portion 123 of the second belt 121 moves in the first direction toward the hinged tray unit 150 while a second lower portion 124 of the second belt 121 moves in the second direction away from the hinged tray unit 150. The second actuator is connected to at least one of the pair of second rollers 122 and causes the belt to move when the second actuator is operated. In an embodiment, the first actuator 115 and second actuator operate such that the first actuator 115 causes the first conveyor 110 moves faster than the second conveyor, causing a food product that is partially wrapped by the food dough casing 101 to be become fully wrapped while being rolled between the first bottom portion 114 of the first conveyor 110 and the second top portion 123 of the second conveyor 120 away from the hinged tray unit 150.

According to an embodiment, the second conveyor 120 may further include a plurality of conveyor dampers 125. In an embodiment, the conveyor dampers 125 are operatively coupled to the pair of second rollers 122 of the second conveyor 120, such that each end of a second roller 122 is coupled to a corresponding conveyor damper 125. In FIG. 1, only two dampers are shown; however, it is understood that there are two more dampers that are not displayed due to the angle of the perspective view. Each of the plurality of conveyor dampers 125 are also operatively coupled to a horizontal surface (not shown) below the second conveyor 120 or to some rigid portion of the device 100. Each conveyor damper 125 may be implemented with a spring or any other known technique for vertically dampening unwanted movement of the second conveyor 120 relative to the horizontal surface or the device 100, and to accommodate for increasing the thickness of the dough casing around the food product or sausage 160. In some embodiments in which the second conveyor includes the plurality of dampers 125, both the first conveyor 110 and the second conveyor 120 are oriented substantially horizontally and substantially parallel to one another.

In some embodiments, the second conveyor 120 does not include the plurality of dampers and, instead, the first conveyor 110 is oriented at an angle in relation to the second conveyor 120 that is oriented substantially horizontally with respect to the bottom surface of the sausage rolling machine, such that the vertical gap between the first bottom portion 114 of the first conveyor 110 and the second top portion 123 of the second conveyor 110 increases in the second direction away from the hinged tray unit 150 (or the hinged roller unit 710). This is to accommodate the increasing cross-sectional width of the rolled sausage as the food dough casing 101 is wrapped around the sausage 160.

The sausage dispenser 130 comprises a top opening 131, a tapered portion 132, a channel 133, and a bottom opening 134. In an embodiment, sausages may be inserted into the dispenser through the top opening 131, and the tapered portion 132 guides the sausages down to the channel 133, which has dimensions such that no more than one sausage may exit through the bottom opening 134. The tapered portion 132 may include a sensor, a timer, a switch, or such, that controls the timing and quantity of the dispensing the sausage to the pair of sausage holders 140.

The hinged tray unit 150, placed beneath the sausage dispenser 130, includes an angled tray 151, at least one roller 154, a hinge 153, and an arm body 152. The angled tray 151 is connected to the arm body 152 along the long sides (i.e. parallel to the sausage 160) of the angled tray 151 and the arm body 152. In an embodiment, the long side of the hinged tray unit 150 is perpendicular to the first and second directions. In an embodiment, the angled tray 151 and the arm body 152 are portions of a single formed structure. The hinged tray unit 150 serves the purpose of guiding a food dough casing 101 underneath a sausage 160 that is being held on the pair of sausage holders 140 when the hinged tray unit 150 is in a first position (e.g. a resting position as shown in FIGS. 3, 4, and 6), and then guiding the sausage 160 to roll down the angled tray 151 by gravity onto the second conveyor 120 when the hinged tray unit 150 is in a second position (e.g. a flipped position as shown in FIG. 5), causing the sausage 160 to be further wrapped by the food dough casing 101 while rolling down.

Figure 3:
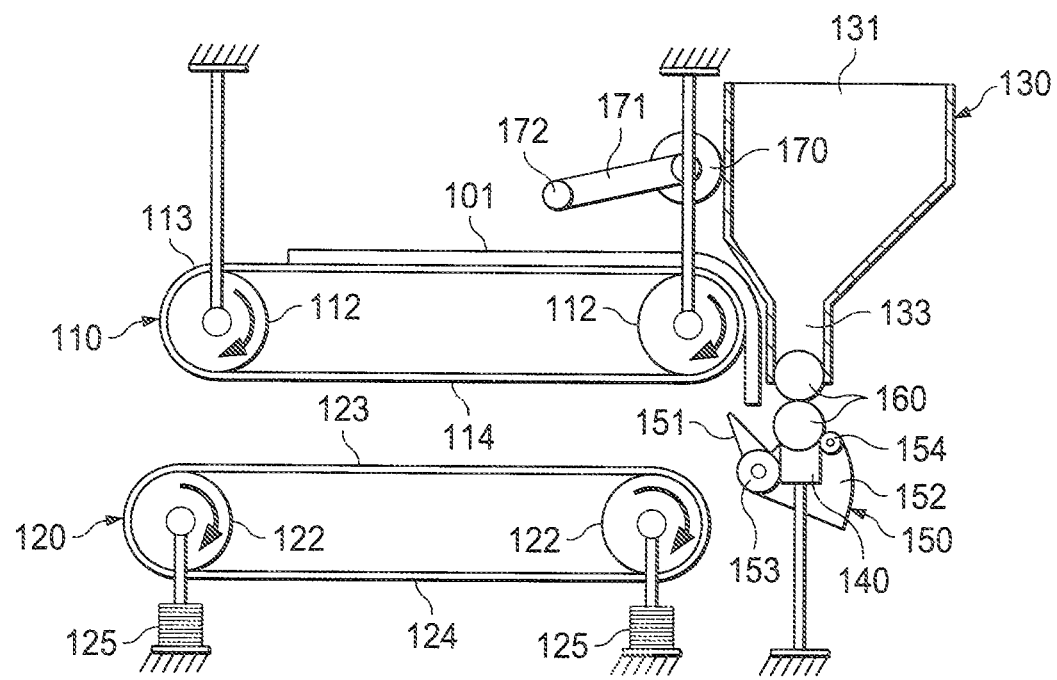
FIG. 3 is a diagrammatic side view illustrating an initial state of a first type of sausage rolling machine according to an embodiment of the present disclosure.
Figure 4:
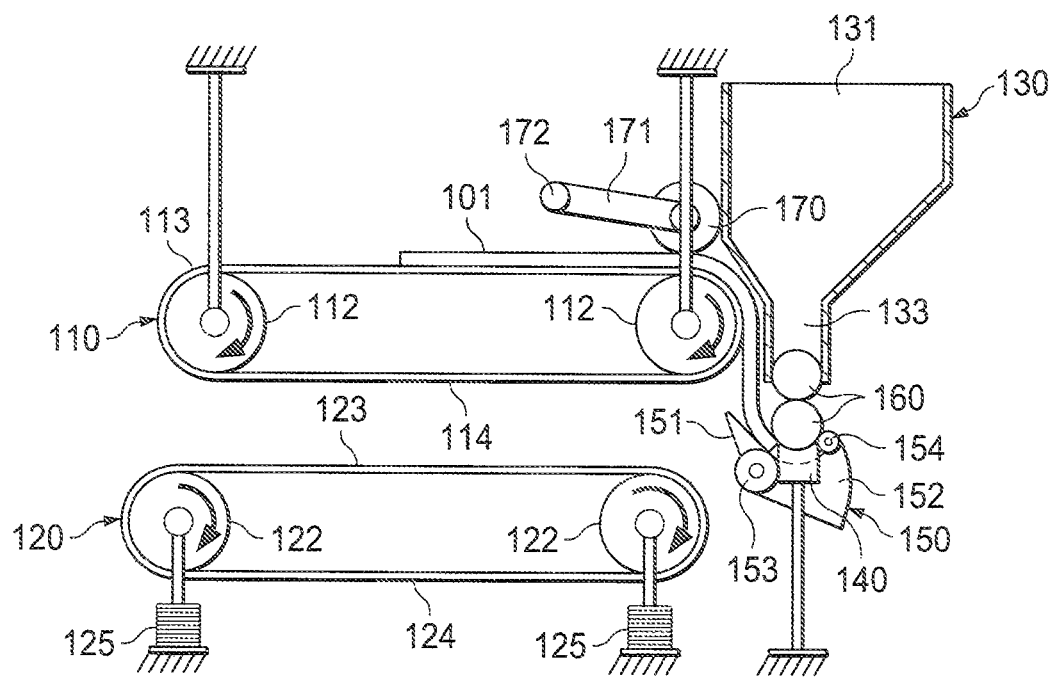
FIG. 4 is a diagrammatic side view illustrating a next state of the first type of sausage rolling machine according to an embodiment of the present disclosure.
Figure 5:
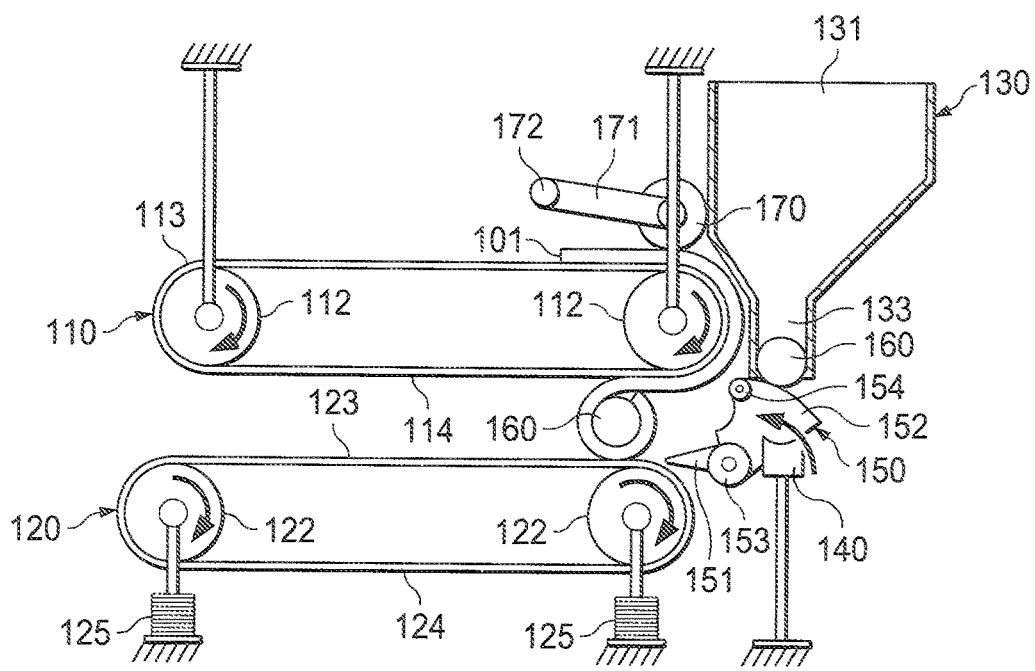
FIG. 5 is a diagrammatic side view illustrating a next state of the first type of sausage rolling machine according to an embodiment of the present disclosure.

The at least one roller 154 is operatively coupled to the arm body so as to assist in holding the sausage 160 in place on the pair of sausage holders 140 when the hinged tray unit 150 is in the first position (as illustrated in FIGS. 3, 4, and 6), and assist in rolling the sausage down the angled tray 151 when the hinged tray unit 150 is in the second position (as illustrated in FIG. 4). The hinge 153 is operatively coupled to the angled tray 151, the arm body 152, and the supporting structures for the hinged tray unit 150 such as to function as the axis of rotation for the hinged tray unit 150. The arm body 152 has a top surface (with respect to when the hinged tray unit 150 is in the first position) that is rounded in a concave shape to support the bottom of a sausage 160. In an embodiment, a side of the arm body 152 that is facing away from the second conveyor 120 (with respect to when the hinged tray unit 150 is in the first position) has an outer surface that is in a convex shape such that, when the hinged tray unit is in the second position, the arm body 152 further serves to block a sausage from being dispensed from the bottom opening 134 of the sausage dispenser 130 (as shown in FIG. 5).

The hinged tray unit 150 rotates about the hinge 153. In an embodiment, the hinge 153 may be activated by a hinge actuator 155. In an embodiment, the hinge actuator 155 may be implemented as a motor. According to an embodiment, the hinge actuator 155 may be controlled based on a sensor, a timer, a switch, or such. According to another embodiment, the hinge 153 may be activated by the weight of the food dough casing 101 pushing down against the angled tray 151. In an embodiment, the hinged tray unit 150 is located between the pair of sausage holders 140, such that, when the sausage 160 is placed on the pair sausage holders 140, dough casing 101 that falls on hinged tray unit 150 may be guided underneath the sausage 160. In an embodiment, the top (concave) surface of the arm body 152 is at level with the pair of sausage holders 140. In another embodiment, the top surface of the arm body 152 is at a level lower than the pair of sausage holders 140 such that food dough casing 101 may at least be partially guided underneath sausage 160, between sausage 160 and the top surface of the arm body 152 before the hinged tray unit 150 moves from the first position to the second position. In an embodiment, the hinged tray unit 150 may also include dampers 156 for the supporting structures of the hinged tray unit 150.

Figure 7:
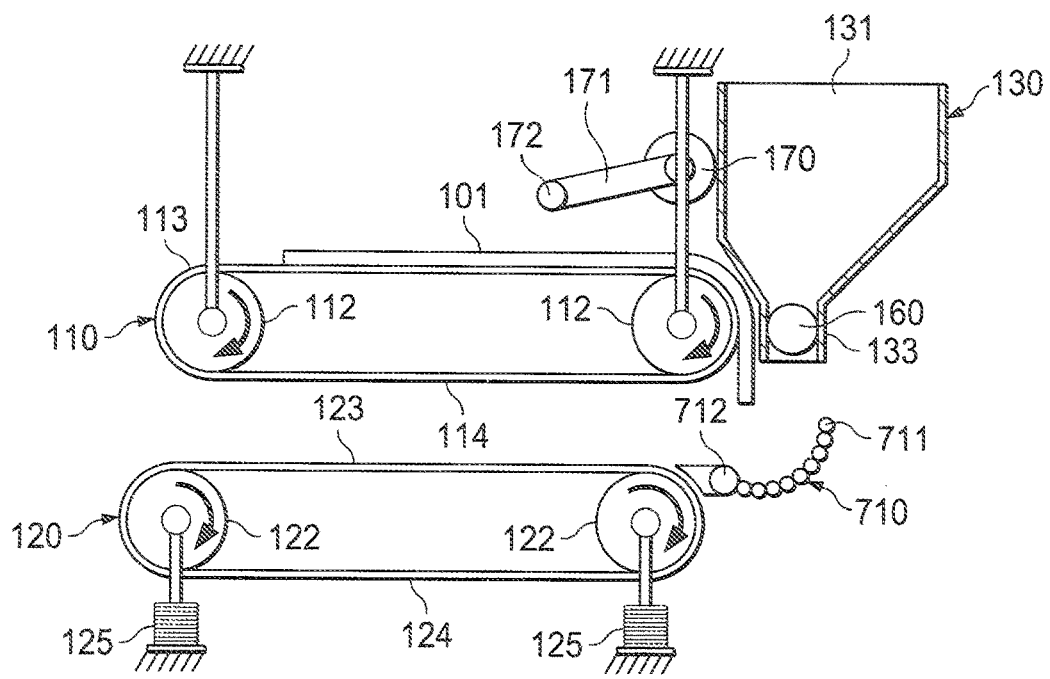
FIG. 7 is a diagrammatic side view illustrating an initial state of the second type of sausage rolling machine according to an embodiment of the present disclosure.
Figure 8:
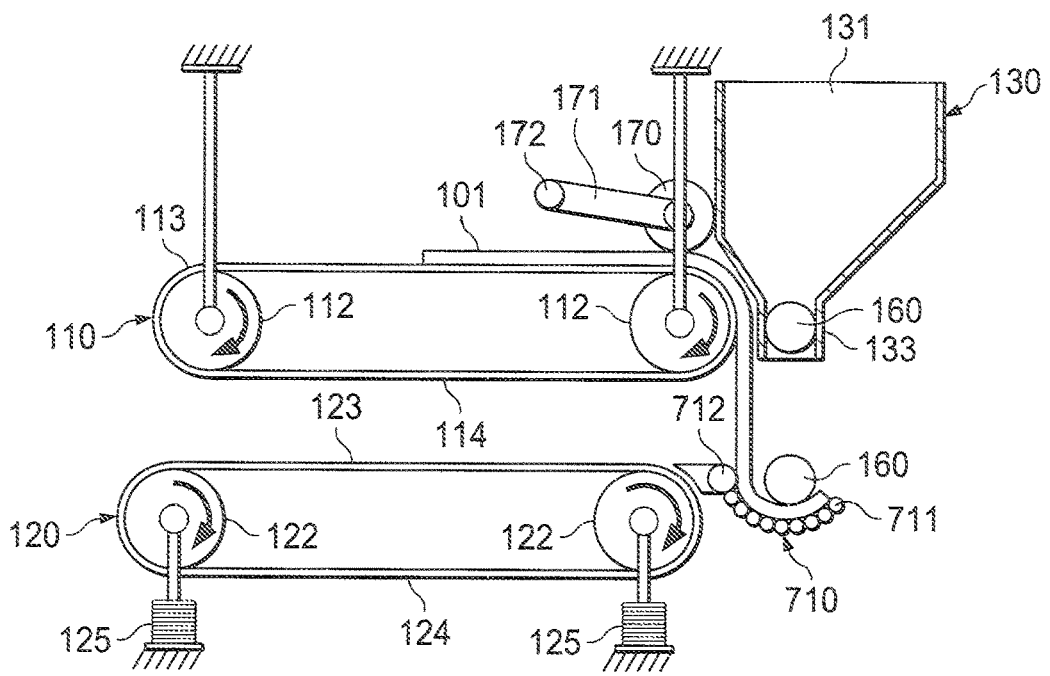
FIG. 8 is a diagrammatic side view illustrating a next state of the second type of sausage rolling machine according to an embodiment of the present disclosure.

According to an embodiment, a hinged roller unit 710 (illustrated in FIGS. 7-10) may be instead of the hinged tray unit 150 to serve a similar function. Hinged roller unit 710 comprises a plurality of rollers 711 and a hinge 712. The hinged roller unit 710 may include at least one arm extending from the hinge 712, the at least one arm having a rounded portion that is angled upwards. The plurality of rollers 711 are arranged to extend perpendicular from each lateral side of each arm and orthogonal to the first and second directions and arranged so as to form, with the at least one extended arm, a cradle extending from the hinge 712 and to guide food dough casing 101 to form a bed over the plurality of rollers 711 before the sausage dispenser 130 dispenses a sausage 160. As such, sausage 160 falls onto the food dough casing 101 when it is dispensed from the sausage dispenser 130, as illustrated in FIG. 8. The hinge 712 is rotatably fixed below an edge of the first conveyor 110 such that food dough casing 101 does not fall directly onto the hinge 712. The hinge 712 may be fixed onto a rigid portion of the device 100 or its surrounding structure. In an embodiment, hinge 720 is adjacent to one end of the concave surface that is formed by the plurality of rollers 711. In an embodiment the hinge 712 is at level with and proximate to the second upper portion 123 of the second conveyor 120 such that a sausage 160 may roll from the hinged roller unit 710 to the second upper portion 123 of the second conveyor 120.

Figure 10:
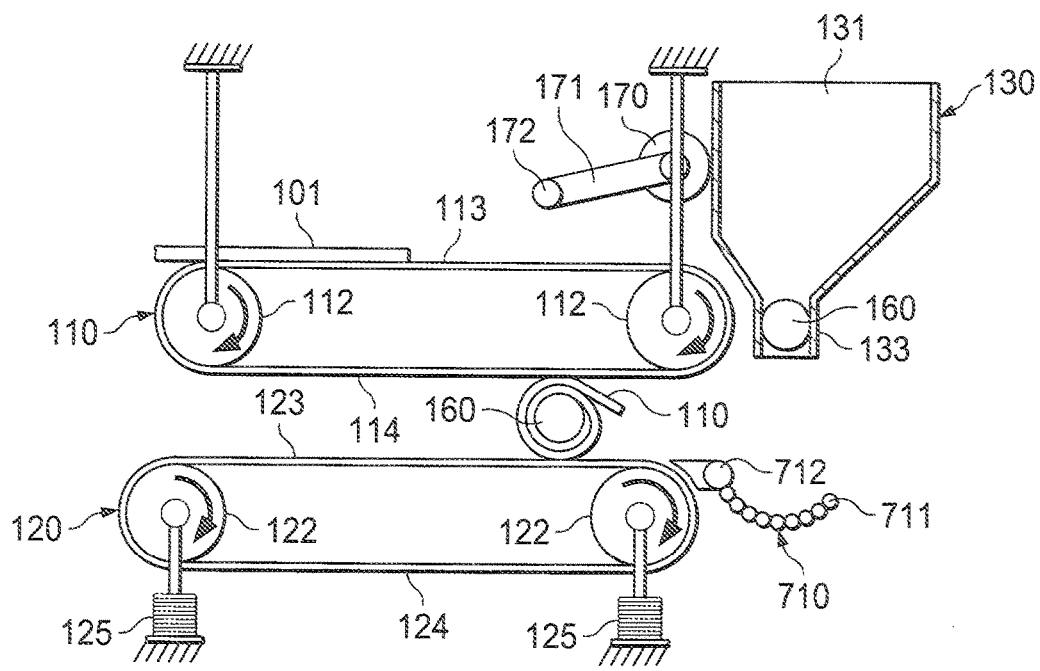
FIG. 10 is a diagrammatic side view illustrating a final state of the second type of sausage rolling machine according to an embodiment of the present disclosure.

In an embodiment, the hinged roller unit 710 rotates about the hinge 712 to transition between a first position and a second position. Similar to the hinged tray unit 150, the first position for the hinged roller unit 710 corresponds to a state in which the plurality of rollers are able to receive a sausage 160 from the sausage dispenser 130 (as illustrated in FIGS. 7, 8, and 10). The second position for the hinged roller unit 710 corresponds to the state in which the hinged roller unit 710 rotated about the hinge 712 such that the concave surface of the plurality of rollers 711 face toward the second direction away from the sausage dispenser 130. In an embodiment, the hinge 712 may be activated by a hinge actuator (not shown) that operates similarly to the hinge actuator 155. In an embodiment, the hinge actuator may be implemented as a motor. According to an embodiment, the actuator may be controlled based on a sensor, a timer, a switch, or such. Although most of the embodiments in the present disclosure are described with the hinged tray unit 150, it is noted that the hinged roller unit 710 may be used instead of the hinged tray unit 150 in those embodiments that are directed to the overall sausage rolling device and process.

In an embodiment, a pressing roller 170 may be included. The pressing roller 170 may be located above the first conveyor 110. In an embodiment, the pressing roller 170 may be operatively connected to an arm 171 that rotates about a hinge 172. In an embodiment, the hinge may be supported by a static or rigid portion of the device 100 or its surrounding structure. The pressing roller 170 may be above a one of the pair of first rollers 112 that is closest to the sausage dispenser 130. The pressing roller 170 presses a food dough casing 101 and helps impede sudden drop of food dough casing 101 from the first upper portion 113 of the first conveyor 110 to the hinged tray unit 150. In an embodiment, the pressing roller 170 rests in a down position and stays substantially down such that the weight of the pressing roller 170 presses against a top surface of food dough casing 101 that is moved past and underneath the pressing roller 170 via the first top portion 113 of the first conveyor 110.

According to an embodiment, the pressing roller 170 may be motorized to move down when the food dough leasing 101 approaches the pressing roller 170 and to move up after the food dough casing 101 passes the pressing roller 170. In an embodiment, the device 100 may further include a sensor to detect when the food dough casing 101 approaches the pressing roller 170 and when the food dough casing 101 has passed the pressing roller 170. In an embodiment, the device 100 may further include a control device coupled to the sensor and an actuator for effectively moving the pressing roller 170 up and down. In an embodiment, the sausage dispenser 130 may dispense the sausage 160 in response to the sensor detecting that the food dough casing 101 is approaching or at the pressing roller 170.

Figure 2:
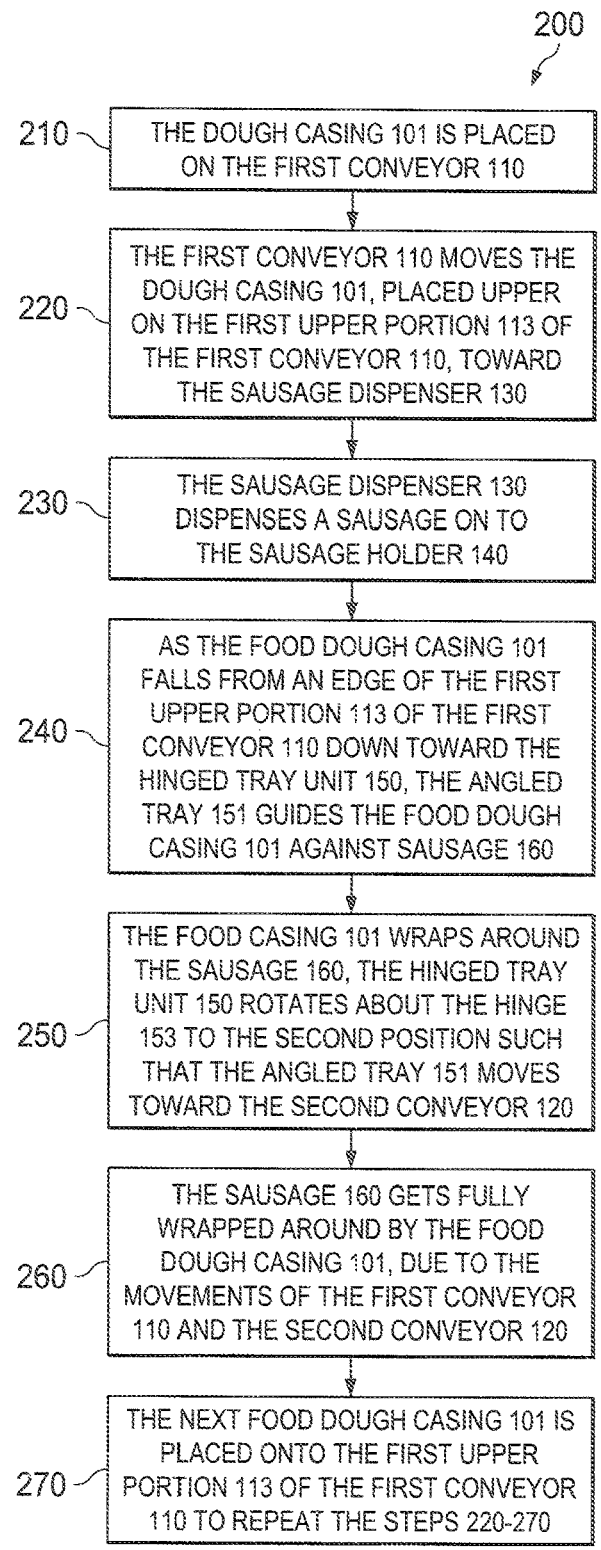
FIG. 2 is a flow diagram illustrating a process for making the sausage roll according to an embodiment of the disclosure.

FIG. 2 depicts flow diagram 200, which illustrates a process for rolling a food dough casing around a sausage according to an embodiment of the disclosure. A sausage roll machine disclosed in FIGS. 1, 3-10 may be used to perform the process in FIG. 2. In step 210, the dough casing 101 is placed onto the first conveyor 110. FIG. 1 is illustrative of step 210.

In step 220, the first conveyor 110 moves the dough casing 101, placed on the first upper portion 113 of the first conveyor 110, toward the sausage dispenser 130. In an embodiment the first conveyor 110 may be using the first conveyor actuator to cause the pair of first rollers 112 to rotate in the direction towards the sausage dispenser 130. FIGS. 3 and 7 are illustrative of step 220 according to an embodiment of the disclosure.

In step 230, the sausage dispenser 130 dispenses a sausage onto the sausage holder 140.

In step 240, as the food dough casing 101 falls from an edge of the first upper portion 113 of the first conveyor 110 down toward the hinged tray unit 150, the angled tray 151 guides the food dough casing 101 against sausage 160. In an embodiment, and illustrated in FIG. 4, the angled tray 151 may guide the food dough casing 101 at least partially underneath the sausage 160, between the sausage 160 and the top surface of the arm body 152, while the hinged tray unit 150 is still in the first position, effectively causing the food dough casing 101 to begin wrapping around the sausage 160.

In various embodiments, step 230 (i.e. sausage dispenser 130 dispensing sausage 160 onto the sausage holder 140) may be performed concurrently with any of steps 210, 220, and 240. For example, as illustrated in FIG. 1, in an embodiment the sausage dispenser 130 may dispense a sausage 160 onto the sausage holder 140 when the food dough casing 101 is placed onto the first upper portion 113 of the first conveyor (i.e. during step 210). In another embodiment, and illustrated in FIG. 2, the sausage dispenser 130 may dispense a sausage 160 onto the sausage holder 140 when the food dough casing 101 is approaching one of the pair of first rollers 112 that is closest to the sausage dispenser 130. In another embodiment, the sausage dispenser 130 may dispense a sausage 160 onto the sausage holder 140 when the food dough casing 101 approaches or is at the optional pressing roller 170. In yet another embodiment, the sausage dispenser 130 may dispense sausage 160 onto food dough casing 101 that has already been guided onto a hinged roller unit 710 (as illustrated in FIG. 8) or onto the top surface of the arm body 152 of the hinged tray unit 150.

In step 250, as the food dough casing 101 wraps around the sausage 160, the hinged tray unit 150 rotates about the hinge 153 to the second position such that the angled tray 151 moves toward the second conveyor 120. In an embodiment, and as illustrated in FIG. 5, this rotation, in turn, causes the food dough casing 101 to be pressed against the sausage 160, and also causes the partially wrapped sausage 160 to roll down toward the second upper portion 123 of the second conveyor 120, guided by the angled tray 151.

Figure 9:
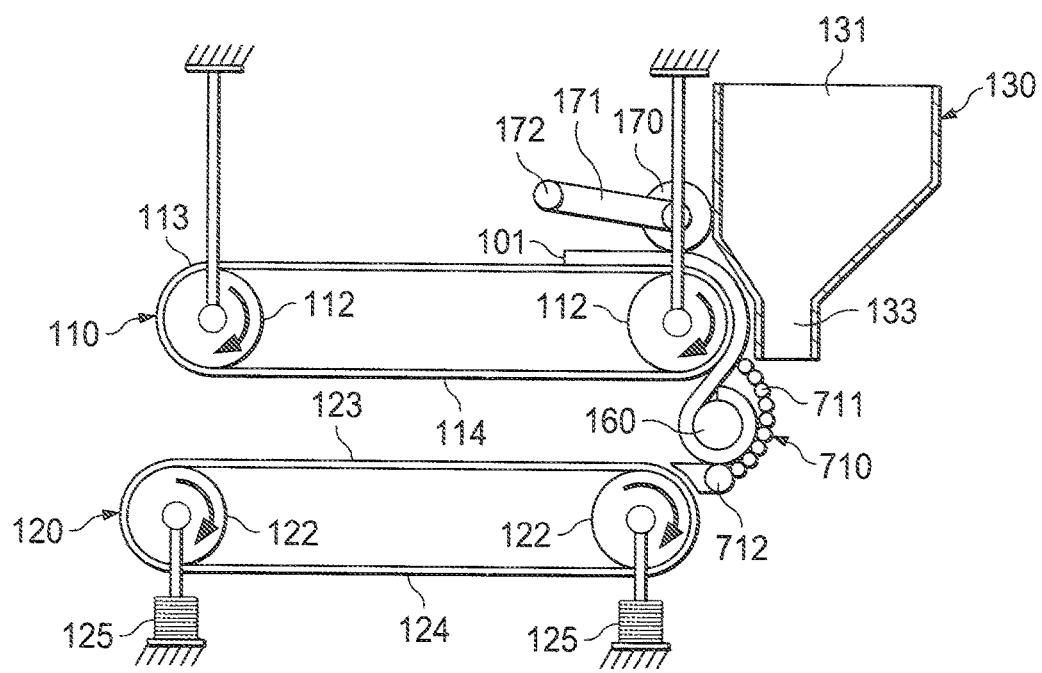
FIG. 9 is a diagrammatic side view illustrating a next state of the second type of sausage rolling machine according to an embodiment of the present disclosure.

According to another embodiment illustrated in FIG. 9, in step 250, the hinged roller unit 710 rotates about the hinge 712 from the first position to the second position, causing the partially wrapped sausage 160 to roll down toward the second upper portion 123 of the second conveyor 120, guided by rollers 711 of the hinged roller unit 710.

In step 260, the sausage 160 gets frilly wrapped around by the food dough casing 101, due to the movements of the first conveyor 110 and the second conveyor 120. That is, the food dough casing 101 continuously wraps around the sausage 160, as the second top portion 123 of the second conveyor 120 moves in the first direction toward the hinged tray unit 150 (or the hinged roller unit 710) while the first bottom portion 114 of the first conveyor 110 moves in the second direction away from the hinged tray unit 150. As already discussed, in an embodiment, the second conveyor may remain stationary. In both scenarios, the first conveyor 110 moves faster than the second conveyor 120, causing the sausage 160 that is partially wrapped by the food dough casing 101 to roll away from the hinged tray unit 150 as the sausage 160 gets fully wrapped by the food dough easing 101. This is illustrated in FIGS. 6 and 10. In an embodiment, dampers 125 help wrap the food dough casing 101 tightly around the sausage 101 while accommodating for variance in the resulting thickness of the resulting wrapped sausage. Meanwhile the hinged tray unit 150 (or the hinged roller unit 710) is rotated back to the first position.

In step 270, the next food dough casing 101 is placed onto the first upper portion 113 of the first conveyor 110 to repeat steps 220-270. In various embodiments, step 270 may be performed concurrently with step 260.

It will be understood that the features and elements described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The above description is illustrative and not restrictive. Many variations of the invention will become apparent to those skilled in the art upon review of this disclosure. The scope of the invention should, therefore, be determined not with referenced to the above description, but instead should be determined with reference to the appended claims along with their full scope of equivalents.

While the invention has been particularly shown and described with references to example embodiments thereof, it will be understood by those skilled in the art that various changes in form and details may be made therein without departing from the scope of the invention encompassed by the appended claims.

What is claimed is:

1. An apparatus for rolling a food dough casing around a sausage, the apparatus comprising:

two conveyors, a first conveyor of the two conveyors configured to rotate so as to move a food dough casing in a first direction toward an edge of the first conveyor, and a second conveyor of the two conveyors disposed below the first conveyor;

a sausage dispenser configured to dispense a sausage, the sausage dispenser comprising a top opening, a tapered portion, and a channel portion below the tapered portion, the channel portion disposed horizontally proximate in the first direction of the first conveyor;

a hinged unit disposed directly below the sausage dispenser and comprising a hinge and a tray portion extending from the hinge, the hinged unit configured to receive at least a portion of the food dough casing that is falling off the edge of the first conveyor when the hinged unit is at a first position, initiate wrapping of the food dough casing around the sausage, and rotate the tray portion about the hinge to a second position such that gravity causes the sausage to roll in a second direction opposite the first direction onto the second conveyor while also causing the sausage to be partially wrapped by the food dough casing, wherein the rotation of the first conveyor above the second conveyor causes the sausage that is partially wrapped to move in the second direction while causing the sausage to be fully wrapped by the food dough casing.

2. The apparatus of claim 1, wherein first conveyor and the second conveyor are substantially parallel to each other.

3. The apparatus of claim 2, further comprising a plurality of dampers operatively coupled to the bottom of the second conveyor.

4. The apparatus claim 1, further comprising a sausage holder configured to receive the sausage being dispensed from the sausage dispenser.

5. The apparatus of claim 4, wherein the hinged unit further comprises:
an angled tray unit configured to guide the falling portion of the food dough casing below the sausage that is resting on the sausage holder and initiate the wrapping of the food dough casing around the sausage; and
a hinge actuator coupled to the hinge and configured to rotate the tray portion of the hinged unit between the first position and the second position.

6. The apparatus of claim 1, further comprising a pressing roller rotatably fixed above the first conveyor and configured to press down on the food dough casing that is falling over the edge of the first conveyor.

7. The apparatus of claim 1, wherein the first conveyor comprises a first pair of rollers and a first belt wrapped around the first pair of rollers to form a first surface on which the food dough casing is moved toward the edge of the first conveyor.

8. The apparatus of claim 7, wherein the second conveyor comprises a second pair of rollers and a second belt wrapped around the second pair of rollers to form a second surface.

9. The apparatus of claim 8, further comprising a first actuator operatively coupled to one of the pair of rollers and configured to rotate the belt of the first conveyor in the first direction.

10. The apparatus of claim 1, wherein the second conveyor is configured to rotate in the first direction, the first conveyor rotating at a faster rate than the second conveyor.

* * * * *